United States Patent Office 2,885,393
Patented May 5, 1959

2,885,393

DEXTRAN-IRON COMPLEX AND PROCESS FOR MAKING SAME

John R. Herb, Easton, Pa., assignor to R. K. Laros Company, Bethlehem, Pa., a corporation of Pennsylvania No Drawing. Application February 24, 1956
Serial No. 567,451

5 Claims. (Cl. 260—209)

The present invention relates to a novel composition of matter, comprising an iron-dextran complex. More particularly, it relates to a novel complex of iron and dextran formed by interaction of a water soluble ferric salt and dextran and to the process whereby said complex is formed.

Iron is recognized as a necessary mineral factor which must be present in the blood in certain concentration for normal body function and well-being. Whereas most individuals maintain the requisite iron levels through food intake, many individuals are known to suffer from iron deficiency (anemia) and require additional iron to supplement that taken in with food.

While the simplest form of supplementing the iron intake would appear to be through oral administration of iron compounds, it has been found that iron given by mouth is incompletely absorbed and its influence on the haemoglobin concentration is extremely slow in many cases. In certain cases the iron compounds are not at all absorbed when taken orally while in some others disturbances of the alimentary tract occur.

In an attempt to overcome these drawbacks, iron oxide has been saccharated and a solution thereof has been employed for intravenous injection with limited success, because the potency of successive batches varied considerably.

It is therefore an object of the present invention to provide novel compounds of iron which may be safely administered intramuscularly and absorbed by the body.

It is a further object of the invention to provide a novel complex of iron which is stable and which may be administered intramuscularly or orally.

Another object of the invention is to produce a novel complex of iron and dextran.

Still another object of the invention is to provide procedures whereby the novel complex of iron and dextran may be prepared.

These and other objects and advantages are realized in accordance with the present invention wherein iron is contacted with dextran under conditions such that a complex therebetween is formed. The reaction which is conducted in water requires extensive contact between the reagents. The iron is introduced as a ferric salt which is water soluble. The novel complex formed by interaction of iron and dextran is soluble in water and may be recovered therefrom by selective precipitation which leaves excess ferric salt and/or alkali in solution.

Dextran, or gum dextran as it is sometimes called, is a polysaccharide having the empirical formula $(C_6H_{10}O_5)_n$ and is obtained by the fermentation of a sucrose-containing material such as sugar cane, sugar beet sorghum, maple sap, and the like. It is preferably fermented by a bacterium known as Leuconostoc Van Tieghem Amend. Hucker and Pederson, species *Leuconostoc mesenteroides* (Cienkowski Van Tieghem), Bergey's Manual Determinative Bacteriology, fifth edition. The dextran is a viscous, mucilaginous substance which in aqueous solution is dextro-rotary with a value $a_d^{20}$ of 200. It is soluble in alkali and is precipitated by alcohol from its aqueous solution. Because of its high molecular weight, often reaching 180,000, it is not directly suitable for injection but is generally first hydrolyzed with acid, filtered and fractionated to recover a portion of molecular weight suitable for injection, viz., 30,000 to 80,000 or lower.

In place of using the fractionated dextran as starting material in the practice of the present invention, there may be employed a hydrolysis mixture. Water-soluble organic solvents such as lower alkanols and the like may be employed to precipitate the complex of iron with the dextran molecules of higher molecular weight while the undesired fractions of low molecular weight will remain in solution and can be discarded. Since fractionation represents one of the most expensive steps in preparing a suitable grade of dextran, the novel process considerably reduces the over-all processing expenses.

In practicing the invention, the reagents can be added in any sequence. When the alkali procedure is followed, the alkali is added slowly to an aqueous solution of a ferric salt in sufficient amount to bring the pH to at least about 2.0, and preferably to about 2.3. If the dextran is added to the ferric salt solution before the alkali, however, the addition of alkali need not be controlled. The formation of the complex can be accelerated by heating.

Following formation of the complex, it may be isolated by addition of a water-soluble organic solvent such as a lower alcohol, ketone, glycol, mixtures thereof, or the like. Preferably volatile solvents such as the lower alkanols are employed, since this facilitates subsequent elimination. The precipitated complex can be purified by successive dissolutions in water followed by precipitations with alcohol or the like. In addition, the solution of the complex may be heated to partially degrade the dextran and alkali subsequently added to render the solution highly alkaline. Any unreacted iron will then be taken up by the dextran. The solution can then be neutralized and the dextran complex isolated. The isolated complex is then dissolved in water to form a stock solution which can be brought to any desired concentration.

As ferric salts there may be employed any water-soluble salts such as ferric cloride, nitrate, sulfate, acetate, or the like. The specific anion is not material since it does not enter into the reaction. Suitable alkalies include alkali metal hydroxides, ammonium hydroxide, tetramethyl ammonium hydroxide, and the like, as well as the carbonates and bicarbonates of these alkalies, although any water-soluble alkalies may be similarly employed.

The ratio between the ferric compound and the dextran may be varied within wide limits although the dextran will generally form a complex comprising up to about 27% by weight of Fe. Conveniently, the ferric compound can be employed in sufficient amount to provide one mole of Fe for each anhydroglucose unit $(C_6H_{10}O_5)$ of the dextran. Since the ferric salts are relatively inexpensive they can be employed in excess without materially increasing the cost of the process, and the excess will merely not be taken up as a complex. The Fe content of the complex is at least 16% by weight, although the preferred Fe content is 18% to about 27%.

The solution of the novel complex should contain at least 2% by weight of Fe to provide a suitable iron level although it may range as high as 7% with about 5% preferred. With a complex which contains 27% by weight of Fe a 2% by weight solution of Fe corresponds to about a 7% by weight concentration of the complex, the practical minimum. With a complex containing only 16% by weight of Fe, a 7% Fe solution corresponds to a maximum complex concentration of about 44%.

Preferably the complex concentration is about 15% which for the preferred complex containing about 18% by weight of Fe corresponds to an Fe content of about 5% by weight based on the solution of the complex.

The novel complex is extremely stable and may be diluted or dried and redissolved without difficulty. When excess ferric salt, if present, has been removed solutions of the novel complex may be rendered alkaline or acidic without destruction. In addition to its use for intramuscular injection in the treatment of anemia or other iron deficiency conditions in animals or human beings, the complex may be utilized wherever a readily absorbable source of iron is required as in soil conditioners and agricultural nutrients. If the initial ferric salt contains radioactive iron, the dextran complex will also be radioactive and can be employed wherever a source of radioactive iron is desired for treatment or tracer techniques.

The following example is illustrative of a procedure whereby the novel complex may be formed:

*Example 1*

A four liter beaker is charged with 900 ml. of tap water and 118 grams of $FeCl_3 \cdot 6H_2O$ (molecular weight of 270.5) are dissolved therein. The solution is stirred and a thin stream of 336 ml. of 10% sodium carbonate solution is added, bringing the pH to about 2.3. 90 grams of dextran —Laros— are added with stirring until fully dissolved and the solution then heated to 60–70° C. After agitation at that temperature for 30 minutes the solution is cooled to 31° C. over a period of 40 minutes. A thin stream of 1600 ml. of 87% isopropanol is introduced with stirring and a precipitate begins to form. Following addition of all the isopropanol the resultant precipitate is allowed to stand for 15 minutes and the supernatant decanted off and discarded. The precipitated dextran-iron complex is redissolved in 600 ml. of tap water at 40° C., cooled to about 30° C., and then reprecipitated with 811 ml. of 87% isopropanol. The dissolution and precipitation are repeated and the precipitate dissolved again at 40° C. in 600 ml. of tap water, the solution having a pH of 2.3. The resulting solution is placed under a pressure of 15 pounds per square inch and heated to 120° C. After 20 minutes at the elevated temperature, heating is discontinued and the solution agitated at moderate speed until the temperature drops to about 30° C. The pH is then raised to 11.7 by the dropwise addition of 35 ml. of 10% sodium hydroxide solution. The complex solution is agitated for 30 minutes with formation of a small amount of suspended matter. The suspension is heated to 121° C. at 15 pounds per square inch pressure and after 20 minutes at that temperature is agitated for an additional 30 minutes while cooling to 30° C. The pH is then adjusted to 6.0 by addition of 1.5 ml. of concentrated hydrochloric acid and the suspension centrifuged for 15 minutes. The small amount of separated solids is discarded and 811 ml. of 87% isopropanol solution are added to the supernatant. The precipitate is redissolved in 800 ml. of water at 40° C. and concentrated over a period of one hour at 80–90° C. to a volume of 400 ml. having a solids content of 20.5%, the Fe constituting 5.0% based on the dextran solution and about 24% based on the weight of the complex. A 15% stock solution of the complex is prepared by dilution to 550 ml., the solution having a pH of 5.7.

The concentration of the solution of the complex may vary within wide limits although a solution containing 50 mg. Fe per ml. and rendered isotonic has proven satisfactory with a complex containing about 18% iron based on the weight of dextran. With animals exhibiting a reduced haemoglobin content, a single daily intramuscular injection of 2 ml. of solution (100 mg. Fe) produces an increase which is noticeable within a short period as compared with oral administration of iron. Greater or lesser amounts may be administered depending upon the condition of the patient.

Various changes and modifications may be made without departing from the spirit and scope of the present invention and it is intended that such obvious changes and modifications be embraced by the annexed claims.

Work has been done with the iron-dextran complex of this invention in human therapy but this work has not as yet been completed.

What is claimed is:

1. The process of producing a composition which comprises heating an aqueous solution of dextran and a water soluble ferric salt in admixture with an alkali at a pH of about 2.3 to form a precipitable iron-dextran composition, precipitating the iron-dextran composition and redissolving the same in water forming an acid solution having a pH of about 2.3, heating the dissolved iron-dextran composition under a pressure of about 15 p.s.i. and under acidic conditions, discontinuing the heating under pressure and allowing the solution to cool, adding an alkali to the cold dissolved iron-dextran composition in amounts sufficient to render the solution alkaline, heating the dissolved alkaline iron-dextran composition under a pressure of about 15 p.s.i., discontinuing the heating under pressure, and recovering the resulting iron-dextran complex.

2. The process of claim 1 in which the recovered iron-dextran complex is further treated by the steps comprising reprecipitating the iron-dextran complex and redissolving the precipitated iron-dextran complex in a sufficient amount of water to form an iron-dextran complex solution containing about 5% iron.

3. The process of claim 2 in which the alkali is an alkali metal carbonate.

4. The iron-dextran complex produced according to the process of claim 3.

5. The iron-dextran complex produced according to the process of claim 1.

References Cited in the file of this patent

UNITED STATES PATENTS

| | | |
|---|---|---|
| 2,518,135 | Gaver | Aug. 8, 1950 |
| 2,644,815 | Gronwall et al. | July 7, 1953 |
| 2,820,740 | London et al. | Jan. 21, 1958 |

OTHER REFERENCES

Cappell et al.: "British Medical Journal," November 27, 1954; pages 1255–1257 relied on.